(12) United States Patent
Bourque et al.

(10) Patent No.: US 11,920,047 B2
(45) Date of Patent: Mar. 5, 2024

(54) METHOD FOR PREPARING THERMOCHROMIC WATER-BASED GEL INK COMPOSITIONS, AND THERMOCHROMIC WATER-BASED GEL INK COMPOSITIONS THEREOF

(71) Applicant: SOCIÉTÉ BIC, Clichy (FR)

(72) Inventors: Alexander Bourque, Clichy (FR); Aurore Sauvage, Clichy (FR)

(73) Assignee: SOCIÉTÉ BIC, Clichy (FR)

( * ) Notice: Subject to any disclaimer, the term of this patent is extended or adjusted under 35 U.S.C. 154(b) by 0 days.

(21) Appl. No.: 17/997,497

(22) PCT Filed: Apr. 28, 2021

(86) PCT No.: PCT/EP2021/061187
§ 371 (c)(1),
(2) Date: Oct. 28, 2022

(87) PCT Pub. No.: WO2021/219753
PCT Pub. Date: Nov. 4, 2021

(65) Prior Publication Data
US 2023/0167325 A1    Jun. 1, 2023

(30) Foreign Application Priority Data

Apr. 30, 2020    (EP) .................... 20305424

(51) Int. Cl.
*C09D 11/50*    (2014.01)
*B43K 7/00*    (2006.01)
(Continued)

(52) U.S. Cl.
CPC ............. *C09D 11/50* (2013.01); *C09D 11/17* (2013.01); *B43K 7/00* (2013.01); *B43K 8/024* (2013.01)

(58) Field of Classification Search
CPC .......... B43K 7/00; B43K 8/024; C09D 11/50; C09D 11/17; C09D 11/16; C09D 11/54; C09D 11/02
(Continued)

(56) References Cited

U.S. PATENT DOCUMENTS 5,474,780 A    12/1995    Chang
6,863,720 B2    3/2005    Kitagawa et al.
(Continued)

FOREIGN PATENT DOCUMENTS

CN    101809100 A    6/2015
CN    105838013 A    8/2016
(Continued)

OTHER PUBLICATIONS

International Search Report and Written Opinion issued in International Application No. PCT/EP2021/061187 dated Sep. 2, 2021 (8 pages).
(Continued)

*Primary Examiner* — David J Walczak
(74) *Attorney, Agent, or Firm* — Bookoff McAndrews, PLLC

(57) ABSTRACT

A method for preparing a thermochromic water-based gel ink composition, as well as a thermochromic water-based gel ink composition thereof comprising a specific monocarboxylic or polycarboxylic acid. A writing instrument, such as a ballpoint pen, a brush pen, a marker, a highlighter, and a felt pen, comprising a thermochromic water-based gel ink composition according to the disclosure.

20 Claims, 2 Drawing Sheets

(51) Int. Cl.
*B43K 8/02* (2006.01)
*C09D 11/17* (2014.01)

(58) Field of Classification Search
USPC .............. 106/31.16, 31.17, 31.2, 31.6, 31.65
See application file for complete search history.

(56) References Cited

U.S. PATENT DOCUMENTS

| | | | |
|---|---|---|---|
| 9,315,672 B2* | 4/2016 | Ichikawa | ................. C09K 9/02 |
| 11,608,440 B2* | 3/2023 | Shivkumar | ............. C09B 57/00 |
| 2002/0185035 A1 | 12/2002 | Kitagawa et al. | |

FOREIGN PATENT DOCUMENTS

| | | |
|---|---|---|
| CN | 110621651 A | 12/2019 |
| EP | 2511353 A4 | 3/2014 |
| EP | 3042942 B1 | 5/2018 |
| JP | 5366044 B2 | 12/2013 |
| JP | 6239933 B2 | 11/2017 |
| JP | 6245511 B2 | 12/2017 |
| WO | 2018197807 A1 | 11/2018 |

OTHER PUBLICATIONS

First Search issued in corresponding Chinese Application No. 202180021955, dated Aug. 10, 2023.

* cited by examiner

METHOD FOR PREPARING THERMOCHROMIC WATER-BASED GEL INK COMPOSITIONS, AND THERMOCHROMIC WATER-BASED GEL INK COMPOSITIONS THEREOF

CROSS REFERENCE TO RELATED APPLICATIONS

This application is a National Stage Application of International Application No. PCT/EP2021/061187, filed on Apr. 28, 2021, now published as WO2021219753 and which claims priority from European Application No. 20305424.2, filed on Apr. 30, 2020, the entire contents of which is incorporated herein by reference.

TECHNICAL FIELD

The present disclosure relates to a method for preparing a thermochromic water-based gel ink composition, as well as a thermochromic water-based gel ink composition thereof comprising a specific monocarboxylic or polycarboxylic acid. The present disclosure also concerns a writing instrument, such as a ballpoint pen, a brush pen, a marker, a highlighter, and a felt pen, comprising a thermochromic water-based gel ink composition according to the disclosure.

BACKGROUND

Thermochromic pigment compositions exhibit reversible discoloration properties related to a change in temperature. They display reversible color-change between colored and decolored states with prominent hysteresis characteristics due to temperature change, and retain either a colored state or a decolored state in an interchangeable and reversible manner even after terminating the application of heat or cold required for the color-change. These compositions find application when ink marking requires repeated erasures.

The thermochromic effect of an ink works through the combination of the following three compounds:

(A) an electron-donating color-developing organic compound (leuco-dye compound), (B) an electron-accepting compound (color developer compound), and (C) a compound serving as a reaction medium which controls color reaction between components (A) and (B), and capable of leading to a reversible electron-donating/accepting reaction attributable to compounds (A) and (B).

Temperature changes reversibly cause coloring or discoloration of the inks. For the thermochromic ink compositions of the present disclosure, the increases in temperature will cause erasure of the ink, while cooling the ink will cause the color to reappear. These changes follow the scheme of FIG. 1. In this scheme, the decoloration onset temperature of the ink color is T3, the complete discoloration temperature is T4 and TG is the average temperature between T3 and T4. Conversely, the temperature at which the color of the ink begins to reappear is T2, the complete recoloration temperature is T1 and TH is the average temperature between T1 and T2. The color-change hysteresis width (ΔH) is the difference between (TH) and (TG).

In general, the methods used for preparing thermochromic ink compositions comprise cleaning/washing step to remove the reaction materials used during the encapsulation reaction, such as centrifugation or filtration step prior to ink formulation. These additional steps add significant costs to the industrial process from both an equipment point of view and from a workforce point of view.

For example, EP 2 511 353 discloses an aqueous ink ball point pen containing thermochromic pigments microcapsules prepared by a process implementing filtration/centrifugation steps.

U.S. Pat. No. 6,863,720 discloses a thermosensitive color-changing dry offset ink implementing the use of strong acids which may cause corrosion of industrial installations, and browning/yellowing of organic materials such as gelling agents.

The method of the disclosure allows the suppression of the above-mentioned steps and drawbacks, significantly stream-lining the method. Indeed, in the method of the disclosure, the thermochromic pigment microcapsules are added directly to the thermochromic water-based gel ink composition without the need for any additional processing step such as washing steps coupled with centrifugation and/or filtration steps, thereby simplifying the industrial process and reducing the global cost of production.

In addition, the surfactants generally used during the encapsulation process are in a "deprotonated form", meaning that they are in a negatively charged form. When added to a water-based gel ink, the anionic surfactants interact with gelling agents such as xanthan gum and disrupt the gel network. This causes a loss of gelling effect and a substantial reduction of the ink viscosity at low shear rates, leading to ink quality problems, such as sedimentation and agglomeration of the thermochromic pigment microcapsules in the ink reservoir, ink leakage, inhomogeneous writing traces, and formation of bubbles in the pen body.

SUMMARY

The inventors have now surprisingly discovered a method overcoming these issues and improving the stability of thermochromic water-based gel ink compositions, through a process comprising an acidification step of the thermochromic pigment microcapsules (slurry) prior to the formulation of the final water-based gel ink, wherein the acidification is carried out until the pH of the thermochromic pigment microcapsules (slurry) reaches a pH lower than or equal to 4.6, preferably a pH lower than or equal to 4.5, and more preferably a pH lower than or equal to 4. For the purposes of the present disclosure, the term "stability" is intended to mean that the thermochromic water-based gel ink composition of the disclosure is stable, in particular regarding the viscosity of the gel which shall not vary, and more particularly which shall remain sufficient. In particular, the thermochromic water-based gel ink compositions according to the disclosure are stable during storage and/or do not cause corrosion of the pen tips and/or no sedimentation phenomenon and/or no clogging of the pen tips. The method of the disclosure allows the conversion of the surfactant present in the thermochromic pigment microcapsules in a "protonated form" (meaning in a non-ionic form), thus avoiding a disruption of the gel network. In fact, the acidification step of the method of the disclosure, at a pH lower than or equal to 4.6 at the end of the acidification steps, preferably at a pH lower than or equal to 4.5, and more preferably at a pH lower than or equal to 4, prevents the decomposition of the gel network when adding the thermochromic pigment microcapsules to the water-based gel ink.

Hereinafter, a detailed description of the present disclosure will be given. The specific embodiments are meant better illustrate the present disclosure, however, it should be understood that the present disclosure is not limited to these specific embodiments.

The present disclosure thus relates to a method for preparing a thermochromic water-based gel ink composition comprising the steps of:

(i) preparing a thermochromic pigment composition by mixing:

(A) at least one electron-donating color-developing organic compound, (B) at least one electron-accepting compound, and (C) at least one color change temperature regulator, which is a compound acting as a reaction medium for electron exchange between compounds (A) and (B), (ii) encapsulating the thermochromic pigment composition prepared in step (i) in presence of a copolymer surfactant comprising at least one monomer of maleic anhydride, to generate an aqueous suspension of thermochromic pigment microcapsules (slurry), in particular at a controlled pH ranging from 5.0 to 6.0, (iii) acidifying the aqueous suspension of thermochromic pigment microcapsules obtained in step (ii) at a pH lower than or equal to 4.6, preferably at a pH lower than or equal to 4.5, and more preferably at a pH lower than or equal to 4, by adding a monocarboxylic or polycarboxylic acid, the amount of monocarboxylic or polycarboxylic acid preferably ranging from 0.5 to 5% by weight, relative to the total weight of the aqueous suspension of thermochromic pigment microcapsules, (iv) preparing a thermochromic water-based gel ink composition comprising the aqueous suspension of thermochromic pigment microcapsules obtained in step (iii) and at least a gelling agent (capable of generating a gelling effect), such as xanthan gum, sodium alginate, sodium carboxymethyl cellulose, gellan gum, tragacanth gum, and diutan gum, and preferably xanthan gum, the pH of the thermochromic water-based gel ink composition being controlled for ranging preferably from 6.0 to 7.0.

DETAILED DESCRIPTION

Figure 1:
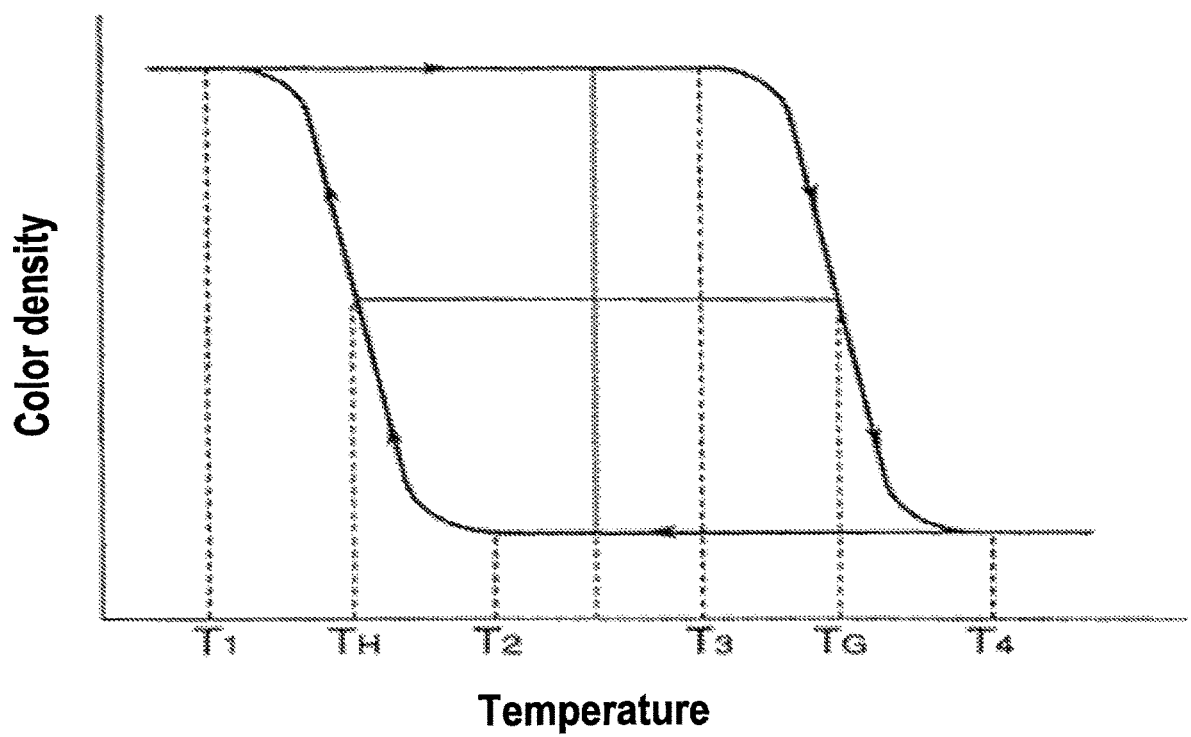
FIG. 1 is a graph of color density versus temperature.

In the sense of the present disclosure, the expression "comprising a" should be understood as being synonymous with "comprising at least one".

In the sense of the present disclosure, the expressions "between . . . and . . . " or "ranging from . . . to . . . " should be understood as including the values of the limits.

Step (i) of preparing the thermochromic pigment composition is advantageously prepared by dissolving the compounds (A) and (B) in the color change temperature regulator (C), and then stirring until a homogeneous mixture is obtained using a stirrer. The mixing of the components (A), (B) and (C), is advantageously carried out at a temperature ranging from 60 to 160° C., and more advantageously from 80 to 130° C. The components (A), (B) and (C) are preferably mixed for a period running from 15 minutes to 3 hours, and more preferably from 30 minutes to 2 hours.

The thermochromic pigment composition of the disclosure is prepared by dissolving the compounds (A) and (B) in the color change temperature regulator (C), and then stirring until a homogeneous mixture is obtained using a stirrer such as a simple agitation pale.

As the electron-donating color-developing organic compound (A), conventionally known compounds such as diphenylmethane phthalides, phenylindolyl phthalides, indolylphthalides, ethylenophthalides, ethylenoazaphthalides, diphenylmethane azaphthalides, phenylindolyl azaphthalides, pyridines, quinazolines and bisquinazolines, fluorenes, fluoranes, styrylquinones and styrylquinolines, and lactones diazarhodamine, may be mentioned without limitation, examples of these compounds being presented hereinafter.

The electron-donating color-developing organic compound (A) may thus be chosen from the group consisting of 3-(4-diethylamino-2-ethoxyphenyl)-3-(1-ethyl-2-methylindol-3-yl)-4-azaphthalide (Blue 63, CAS number: 69898-40-4), 3,3-bis(p-dimethylaminophenyl) dimethylaminophthalate (CAS number: 1552-42-7), 2'-chloro-6'-(diethylamino)-3'-methylfluorane (CAS number: 21121-62-0), 6'-(diethylamino)-1',3'-dimethylfluorane (CAS number: 21934-68-9), 2-chloro-6-(diethylamino)-fluorane (CAS number: 265-67-23-7), 3-diethylaminobenzofluorane (CAS number: 266-28-47-7), 3',6'-bis(diethylamino)-2-(4-nitrophenyl)spiro[isoindole-1,9'-xanthene]-3-one (CAS number: 29199-09-5), 2-phenylamino-3-methyl-6-diethylaminofluorane (CAS number: 29512-49-0), 2'-(dibenzylamino)-6'-(diethylamino) fluoran (CAS number: 34372-72-0), 2-(2,4-dimethylphenylamino)-3-methyl-6-diethylaminofluorane (Black 15, CAS number: 36431-22-8), 3-(1,2-dimethyl-3-indolyl)-3-[4-(diethylamino)-2-methylphenyl]phthalide (CAS number: 36499-49-7), 3',6'-dimethoxyfluorane (CAS number: 36886-76-7), 3,3-bis-(1-butyl-2-methyl-indol-3-yl)-3H-isobenzofuran-1-one (Red 40, CAS number: 50292-91-6), 3,3-bis-(2-methyl-1-octyl-1H-indol-3-yl)-3H-isobenzofuran-1-one (CAS number: 50292-95-0), 2'-anilino-6'-[ethyl(p-tolyl)amino]-3'-methylspiro[isobenzofuran-1(3H),9'-[9H]xanthene]-3-one (CAS number: 59129-79-2), 3-(N-ethyl-n-isopentylamino)-6-methyl-7-anilino-fluorene (CAS number: 70516-41-5), 3-[4-(diethylamino)phenyl]-3-(1-ethyl-2-methyl-1H-indol-3-yl)phthalide (CAS number: 75805-17-3), 2'-(2-chloroanilino)-6'-(dibutylamino) fluoran (CAS number: 82137-81-3), 2-phenylamino-3-methyl-6-dibutylaminofluorane (CAS number: 89331-94-2), 3-(1-butyl-2-methyl-1H-indol-3-yl)-6-(dimethylamino)-3-[4-(dimethylamino)phenyl]-3-(1(3H)-isobenzofuranone (CAS number: 92453-31-1), 7-(4-diethylamino-2-hexyloxyphenyl)-7-(1-ethyl-2-methyl-1H-indol-3-yl)-7H-furo[3,4-b]pyridin-5-one (Blue 203, CAS number: 98660-18-5), 7,7-bis[4-(diethylamino)-2-ethoxyphenyl]furo[3,4-b]pyridin-5-one (CAS number: 132467-74-4), N,N-dimethyl-4-[2-[2-(octyloxy)phenyl]-6-phenyl-4-pyridinyl]benzenamine (Yellow CK37, CAS number: 144190-25-0), 3-(2,2-bis(1-ethyl-2-methylindol-3-yl)vinyl)-3-(4-diethylaminophenyl)-phthalide (CAS number: 148716-90-9), and mixtures thereof.

According to a preferred embodiment, the electron-donating color-developing organic compound (A) is chosen from the group consisting of 3-(4-diethylamino ethoxyphenyl)-3-(1-ethyl-2-methylindol-3-yl)-4-azaphthalide (Blue 63, CAS number: 69898 4), 2'-(dibenzylamino)-6'-(diethylamino)fluoran (CAS number: 34372-72-0), N,N-dimethyl-4-[2-[2-(octyloxy)phenyl]-6-phenyl-4-pyridinyl]benzenamine (Yellow CK37, CAS number: 144190-25-0), 7-(4-diethylamino-2-hexyloxyphenyl)-7-(1-ethyl-2-methyl-1H-indol-3-yl)-7H-furo[3,4-b]pyridin-5-one (Blue 203, CAS number: 98660-18-5), 2-(2,4-dimethylphenylamino)-3- methyl-6-diethylaminofluoran (Black 15, CAS number: 36431-22-8), 3,3-bis-(1-butyl-2-methyl-indol-3-yl)-3H-isobenzofuran-1-one (Red 40, CAS number: 50292-91-6), and mixtures thereof. As the electron-accepting compound (B), mention may be made, without limitation, of compounds having an active proton, such as compounds having a phenolic hydroxyl group (monophenols or polyphenols) such as bisphenols or trisphenols, and derivatives thereof which have substituents such as alkyl, aryl, acyl, alkoxycarbonyl, carboxy and esters thereof, and amido groups, halogen atoms, and phenol-aldehyde condensation resins.

In the electron-accepting compounds (B) of the disclosure, the following terms mean:

Alkyl: a saturated, linear or branched, $C_1$-$C_{20}$, preferably $C_1$-$C_{12}$, more preferably $C_1$-$C_6$, and even more preferably $C_1$-$C_4$, hydrocarbon-based aliphatic group. The term "branched" means that at least one lower alkyl group such as methyl or ethyl is carried by a linear alkyl chain. As the alkyl group, there may be mentioned, for example, methyl, ethyl, n-propyl, i-propyl, n-butyl, t-butyl and n-pentyl.Aryl: any functional group or substituent derived from at least one aromatic ring; an aromatic ring corresponds to any planar mono- or polycyclic group comprising a delocalized π-system in which each atom of the cycle comprises a p-orbital, said p-orbital overlapping each other; among such aryl groups there may be mentioned phenyl, biphenyl, naphthalene and anthracene groups, but also heteroatom containing aryl groups such as furan (furanyl), pyridine (pyridinyl), pyrrole (pyrrolyl) and thiophene (thiophenyl). The aryl groups of the disclosure preferably comprise from 4 to 12 carbon atoms, and even more preferably from 5 to 6 carbon atoms. Even more preferably, the aryl group of the disclosure is a phenyl group.

Thus, the electron-accepting compound (B) may be chosen from the group consisting of 2,2-bis (4-hydroxy-3-methylphenyl)propane (bisphenol C, CAS number: 79-97-0), 4-hexyl-1,3-dihydroxybenzene (4-hexylresorcinol, CAS number: 136-77-6), 4,4'-cyclohexylidenebisphenol (BPZ, CAS number: 843-55-0), 4,4'-(hexafluoroisopropylidene)diphenol (bisphenol AF, CAS number: 1478-61-1), 4,4'-(1-phenylethylidene)bisphenol (CAS number: 1571-75-1), 2,2'-dihydroxybiphenyl (CAS number: 1806-29-7), 4,4'-ethylidenebisphenol (CAS number: 2081-08-5), 4,4'-(1,4-phenylenediisopropylidene)bisphenol (CAS number: 2167-51-3), 1,1-bis(4-hydroxy-3-methylphenyl)cyclohexane (CAS number: 2362-14-3), 9,9-bis (4-hydroxyphenyl)fluorene (CAS number: 3236-71-3), 4,4'-(1,3-phenylenediisopropylidene)bisphenol (CAS number: 13595-25-0), 1,1,1-tris(4-hydroxyphenyl)ethane (CAS number: 27955-94-8), 4,4'-(2-ethylhexylidene)diphenol (CAS number: 74462-02-5), α,α,α'-tris(4-hydroxyphenyl)-1-ethyl-4-isopropylbenzene (CAS number: 110726-28-8), 4-(1,1,3,3-tetramethylbutyl)phenol (CAS number: 140-66-9), 4-hydroxydiphenyl ether (CAS number: 831-82-3), bis(2-hydroxy-1-naphthyl)methane (CAS number: 1096-84-0), 4-(methylsulfonyl)phenol (CAS number: 14763-60-1), 4-hydroxyphenyl-4'-isopropoxyphenyl sulfone (CAS number: 95235-30-6), 4,4'-dihydroxybiphenyl (CAS number: 92-88-6), 4-hydroxybiphenyl (CAS number: 92-69-3), p-hydroxycumene (CAS number: 99-89-8), 2,4-dihydroxybenzophenone (CAS number: 131-56-6), hydroquinone monomethyl ether (HQMME, CAS number: 150-76-5), 3-n-pentadecylphenol (CAS number: 501-24-6), 4-(2-phenylisopropyl)phenol (CAS number: 599-64-4), 5-chloro-2-(2,4-dichlorophenoxy)phenol (CAS number: 3380-34-5), N-(p-toluenesulfonyl)-N'-(3-(p-toluenesulfonyloxy)phenyl)urea (CAS number: 232938-43-1), 2,2-bis (3,5-dibromo-4-hydroxyphenyl)propane (CAS number: 79-94-7), 4,4'-isopropylidenediphenol (CAS number: 80-05-7), and the 4,4'-sulfonyldiphenol (BPS, CAS number: 80-09-1).

According to a preferred embodiment, the electron-accepting compound (B) is chosen from the group consisting of 2,2-bis(4-hydroxy-3-methylphenyl)propane (bisphenol C, CAS number: 79-97-0), 4-hexyl-1,3-dihydroxybenzene (4-hexylresorcinol, CAS number: 136-77-6), 4,4'-cyclohexylidenebisphenol (BPZ, CAS number: 843-55-0), 4,4'-(hexafluoroisopropylidene)diphenol (bisphenol AF, CAS number: 1478-61-1), 4,4'-(1-phenylethylidene)bisphenol (CAS number: 1571-75-1), 2,2'-dihydroxybiphenyl (CAS number: 1806-29-7), 4,4'-(1,4-phenylenediisopropylidene) bisphenol (CAS number: 2167-51-3), 1,1-bis(4-hydroxy-3-methylphenyl)cyclohexane (CAS number: 2362-14-3), 9,9-bis(4-hydroxyphenyl)fluorene (CAS number: 3236-71-3), 4,4'-(1,3-phenylenediisopropylidene)bisphenol (CAS number: 13595-25-0), 1,1,1-tris(4-hydroxyphenyl)ethane (CAS number: 27955-94-8), 4,4'-(2-ethylhexylidene)diphenol (CAS number: 74462-02-5), α,α,α'-tris(4-hydroxyphenyl)-1-ethyl-4-isopropylbenzene (CAS number: 110726-28-8), and mixtures thereof.

The electron-accepting compound (B) is advantageously a mixture of at least two electron-accepting compounds (B).

The color change temperature regulator (C), which is a compound acting as a reaction medium for electron exchange between compounds (A) and (B), may be chosen from the group consisting of waxes having a melting point ranging from 40 to 80° C., and preferably from 40 to 70° C.

The color change temperature regulator (C) may be chosen from the group consisting of esters, alcohols, carboxylic acids, ketones, amides, and mixtures thereof.

According to a preferred embodiment, the color change temperature regulator (C) may be chosen from the group consisting of 1,2,3-tri-dodecanoyl-glycerol (CAS number: 538-24-9), hexadecyl-3,5-di-tert-butyl-4-hydroxybenzoate (CAS number: 67845-93-6), stearyl benzoate (CAS number: 10578-34-4), octadecyl 3-(3,5-di-tert-butyl-4-hydroxyphenyl)propionate (CAS number: 2082-79-3), and mixtures thereof.

Step (ii) of encapsulating the thermochromic pigment composition prepared in step (i) is advantageously carried out by mixing, under stirring, the thermochromic pigment composition prepared in step (i) with a copolymer surfactant comprising at least one monomer of maleic anhydride, said copolymer surfactant being preferably chosen from the group consisting of copolymers of maleic anhydride, and said copolymer surfactant being more preferably chosen from the group consisting of poly(methyl vinyl ether-alt-maleic anhydride); ethylene-maleic anhydride copolymer; poly(styrene-co-maleic acid); poly(4-styrenesulfonic acid-co-maleic acid); poly(maleic anhydride-alt-1-octadecene); poly(styrene-co-maleic anhydride), partial iso-octyl ester, cumene terminated; and more advantageously poly(methyl vinyl ether-alt-maleic anhydride) and ethylene-maleic anhydride copolymer. In a particularly preferred embodiment, the copolymer surfactant is ethylene-maleic anhydride copolymer.

The copolymer surfactant is favorably in the form of an aqueous solution comprising a base, and more favorably comprising a base chosen from the group consisting of sodium hydroxide (NaOH), potassium hydroxide (KOH), ammonium hydroxide ($NH_4OH$), or thriethanolamine ($C_6H_{15}NO_3$). The base is added to obtain a controlled pH of 5.0-6.0 for the aqueous suspension of thermochromic pigment microcapsules (slurry).

Step (ii) is advantageously carried out at a temperature ranging from 40 to 95° C., and more advantageously from 60 to 90° C., and preferably for a period of at least 2 hours, and more preferably from 2 to 6 hours, until a dispersion of oil droplets in the aqueous phase is obtained.

The microencapsulation methods used for encapsulating the thermochromic pigment composition of step (i) include, without limitation, conventional methods, such as:
  chemical processes which rely on the in situ formation of the microcapsule shell. Representative embodiments of chemical methods include complex coacervation, interfacial polymerization (IFP), polymer-polymer incompatibility, in situ polymerization, centrifugal force process, and submerged nozzle process, the interfacial polymerization (IFP) being the preferred one,
  physico-chemical processes, for example by phase separation or complex coacervation, by evaporation-extraction of solvent, by thermal gelation of emulsions (hot melt), mechanical processes, for example by nebulization/drying (spray drying), by gelling or freezing drops, by coating in a fluidized bed (spray-coating).

According to a preferred embodiment, the microcapsules of thermochromic pigment composition are prepared by in situ polymerization, more preferably from amino resin solution (a capsule coating agent) that may be chosen from the group consisting of a melamine resin, a urea resin, a benzoguanamine resin, and mixtures thereof, and preferably a melamine resin. An aqueous suspension of thermochromic pigment microcapsules (slurry) is then obtained at a controlled pH of 5.0-6.0.

The capsules obtained at the end of step (ii) have advantageous characteristics insofar as they are resistant to mechanical stresses, insoluble and therefore dispersible in water, and show slow agglomeration and sedimentation.

Step (iii) of acidifying the aqueous suspension of thermochromic pigment microcapsules obtained in step (ii) by adding a monocarboxylic or polycarboxylic acid, said monocarboxylic or polycarboxylic acid being preferably non-polymeric.

In a preferred embodiment, step (iii) of acidifying the aqueous suspension of thermochromic pigment microcapsules is realized until the pH of the aqueous suspension of thermochromic pigment microcapsules reaches a pH lower than or equal to 4.6, preferably lower than or equal to 4.5, and more preferably lower than or equal to 4. The amount of monocarboxylic or polycarboxylic acid may vary from 0.5 to 5%, preferably from 0.5 to 4%, more preferably from 0.5 to 3.5%, and even more preferably from 1 to 3.5%, by weight relative to the total weight of the aqueous suspension of thermochromic pigment microcapsules (slurry). The monocarboxylic or polycarboxylic acid may be added hot or cold.

Therefore, at the end of step (iii), the amount of monocarboxylic or polycarboxylic acid preferably ranges from 0.5 to 5%, preferably from 0.5 to 4%, more preferably from 0.5 to 3.5%, and even more preferably from 1 to 3.5%, by weight relative to the total weight of the aqueous suspension of thermochromic pigment microcapsules (slurry).

According to a preferred embodiment, the monocarboxylic or polycarboxylic acid added during the step (iii) of acidifying the aqueous suspension of thermochromic pigment microcapsules preferably comprises from 2 to 10 carbon atoms, and more preferably from 2 to 8 carbon atoms.

According to a preferred embodiment, the monocarboxylic or polycarboxylic acid added during step (iii) is chosen from the group consisting of gallic acid, succinic acid, itaconic acid, glutaric acid, oxalic acid, oxaloacetic acid, pyruvic acid, 2-oxo-glutaric acid, malonic acid, salicylic acid, tartaric acid, lactic acid, citric acid, malic acid, picolinic acid, argininosuccinic acid, 2,4,6-trihydroxybenzoic acid, dihydroxymalic acid, aspartic acid, glutathione, glutamic acid, glutamine, 3-methyl-2-oxovaleric acid, acotinic acid, and mixtures thereof, and more preferably is citric acid or mixtures comprising citric acid.

During the preparation of the thermochromic water-based gel ink composition of step (iv), the aqueous suspension of thermochromic pigment microcapsules (slurry) obtained in step (iii) is mixed with a gelling agent. According to the present disclosure, the gelling agent (i.e. a compound that is capable of generating a gelling effect) is chosen among xanthan gum, sodium alginate, sodium carboxymethyl cellulose, gellan gum, tragacanth gum, and diutan gum, and more preferably xanthan gum.

Hence, the method of the disclosure enables to obtain a thermochromic water-based gel ink composition having the above-mentioned properties, in particular said thermochromic water-based gel ink composition is stable, and more specifically has a viscosity higher than or equal to 1,500 mPa·s, measured at a shear rate of $1$ $s^{-1}$ at 20° C. and constant air pressure. The viscosity of the thermochromic water-based gel ink composition of the disclosure can be measured with a cone plate rheometer, such as Malvern Kinexus Lab pro, with a cone with an angle of 1° having a diameter of 60 mm, at a shear rate of $1$ $s^{-1}$ at 20° C. and constant air pressure.

In addition, the thermochromic water-based gel ink composition of the disclosure exhibits good stability over time, in particular no sedimentation of microcapsules occurs, preferably after two weeks of storage at 20° C., and more preferably after one month of storage at 20° C.

The aqueous suspension of thermochromic pigment microcapsules (slurry) obtained in step (iii) (also named "intermediate thermochromic water-based composition") may also be mixed with other conventional constituents of thermochromic water-based gel ink compositions and specific adjuvants.

Among the adjuvants, mention may be made of:
  rheology modifiers (rheofluidifying agents), such as polyvinylpyrrolidone or hydroxyethylcellulosegelling agents capable of generating a gelling effect, such as xanthan gum or gum arabic,
  antimicrobial agents (biocides), such as isothiazolinones (ACTICIDE® from Thor),
  corrosion inhibitors, such as benzotriazole,
  antifoam agents, such as aqueous dispersions of modified polysiloxane (MOUSSEX® from Synthron),
  pH regulators, such as sodium hydroxide, triethanolamine,
  surfactants, such as polyether polyols (TERGITOL™ from DOW),
  lubricants, dispersants, coalescing agents, crosslinking agents, wetting agents, humectants, antioxidants, UV stabilizers,
  film-forming agents,
  water-soluble solvents, and mixtures thereof.

The pH of the thermochromic water-based gel ink is controlled to range from 6.0 to 7.0 during step (iv).

The disclosure also relates to an aqueous suspension of thermochromic pigment microcapsules as obtained in step (iii) (also named "intermediate thermochromic water-based composition"), comprising:
  thermochromic pigment microcapsules encapsulating a thermochromic pigment composition comprising:
    (A) at least one electron-donating color-developing organic compound, (B) at least one electron-accepting compound, and
(C) at least one color change temperature regulator, which is a compound acting as a reaction medium for electron exchange between compounds (A) and (B), a monocarboxylic or polycarboxylic acid, which is preferably non-polymeric, the amount of said monocarboxylic or polycarboxylic acid preferably ranging from 0.5 to 5% by weight, relative to the total weight of the aqueous suspension of thermochromic pigment microcapsules, a copolymer surfactant comprising at least one monomer of maleic anhydride, water, preferably in an amount ranging from 55 to 85%, and more preferably from 60 to 80%, by weight relative to the total weight of the aqueous suspension of thermochromic pigment microcapsules, said aqueous suspension of thermochromic pigment microcapsules having a pH lower than or equal to 4.6, preferably lower than or equal to 4.5, and more preferably lower than or equal to 4.

The disclosure also relates to a thermochromic water-based gel ink composition, in particular prepared according to the method of the present disclosure described above, comprising preferably a monocarboxylic or polycarboxylic acid as defined according to the disclosure.

The present disclosure particularly concerns a thermochromic water-based gel ink composition comprising:
thermochromic pigment microcapsules encapsulating a thermochromic pigment composition comprising:
(A) at least one electron-donating color-developing organic compound,
(B) at least one electron-accepting compound, and
(C) at least one color change temperature regulator,
a monocarboxylic or polycarboxylic acid, said monocarboxylic or polycarboxylic acid being preferably non-polymeric,
a carrier, and preferably water, and
a gelling agent (i.e. a compound capable of generating a gelling effect), and
a copolymer surfactant comprising at least one monomer of maleic anhydride.

In particular, the thermochromic water-based gel ink composition of the disclosure can be prepared according to the method for preparing a thermochromic water-based gel ink composition described hereinbefore.

For the purposes of the present disclosure, the term "thermochromic water-based gel ink composition" means an ink which is intended to be used in a writing instrument such as ballpoint pens, brush pens, markers, highlighters, and felt pens; it should not be confused with a printing ink used in printing machines and which does not correspond to the same technical constraints, and thus to the same specifications. Indeed, a "thermochromic water-based gel ink composition" intended to be used in a writing instrument within the framework of the disclosure must not contain solid particles of which the size is greater than the channels of the writing instrument, in order to avoid blocking them, which would inevitably lead to writing being irreversibly stopped. In addition, it must not be too fluid, so as to avoid leaks during writing. However, it must be sufficiently fluid to facilitate the flow of the writing action. It must also dry sufficiently rapidly to avoid smudging of the writing medium. Thus, the thermochromic water-based gel ink composition of the disclosure will be suitable for the writing instrument for which it is intended.

The electron-donating color-developing organic compound (A) may be as defined above in relation with the method for preparing a thermochromic water-based gel ink composition according to the disclosure.

In a preferred embodiment, the electron-donating color-developing organic compound (A) of the thermochromic water-based gel ink composition may be chosen from the group consisting of 3-(4-diethylamino-2-ethoxyphenyl)-3-(1-ethyl-2-methylindol-3-yl)-4-azaphthalide (Blue 63, CAS number: 69898-40-4), 2'-(dibenzylamino)-6'-(diethylamino) fluoran (CAS number: 34372-72-0), N,N-dimethyl-4-[2-[2-(octyloxy)phenyl]-6-phenyl-4-pyridinyl]benzenamine (Yellow CK37, CAS number: 144190-25-0), 7-(4-diethylamino-2-hexyloxyphenyl)-7-(1-ethyl-2-methyl-1H-indol-3-yl)-7H-furo[3,4-b]pyridin-5-one (Blue 203, CAS number: 98660-18-5), 2-(2,4-dimethylphenylamino)-3-methyl-6-diethylaminofluoran (Black 15, CAS number: 36431-22-8), 3,3-bis-(1-butyl-2-methyl-indol-3-yl)-3H-isobenzofuran-1-one (Red 40, CAS number: 50292-91-6), and mixtures thereof.

The electron-accepting compound (B) may be as defined above in relation with the method for preparing a thermochromic water-based gel ink composition according to the disclosure.

In a preferred embodiment, the electron-accepting compound (B) of the thermochromic water-based gel ink composition is chosen from the group consisting of 2,2-bis(4-hydroxy-3-methylphenyl)propane (bisphenol C, CAS number: 79-97-0), 4-hexyl-1,3-dihydroxybenzene (4-hexylresorcinol, CAS number: 136-77-6), 4,4'-cyclohexylidenebisphenol (BPZ, CAS number: 843-55-0), 4,4'-(hexafluoroisopropylidene)diphenol (bisphenol AF, CAS number: 1478-61-1), 4,4'-(1-phenylethylidene)bisphenol (CAS number: 1571-75-1), 2,2'-dihydroxybiphenyl (CAS number: 1806-29-7), 4,4'-(1,4-phenylenediisopropylidene)bisphenol (CAS number: 2167-51-3), 1,1-bis(4-hydroxy-3-methylphenyl)cyclohexane (CAS number: 2362-14-3), 9,9-bis(4-hydroxyphenyl)fluorene (CAS number: 3236-71-3), 4,4'-(1,3-phenylenediisopropylidene)bisphenol (CAS number: 13595-25-0), 1,1,1-tris(4-hydroxyphenyl)ethane (CAS number: 27955-94-8), 4,4'-(2-ethylhexylidene)diphenol (CAS number: 74462-02-5), α,α,α'-tris(4-hydroxyphenyl)-1-ethyl-4-isopropylbenzene (CAS number: 110726-28-8), and mixtures thereof.

The color change temperature regulator (C) may be as defined above in relation with the method for preparing a thermochromic water-based gel ink composition according to the disclosure.

In a preferred embodiment, the color change temperature regulator (C) of the thermochromic water-based gel ink composition is chosen from the group consisting of waxes having a melting point ranging from 40 to 80° C., preferably from 40 to 70° C.

The color change temperature regulator (C) may be chosen from the group consisting of esters, alcohols, carboxylic acids, ketones, amides, and mixtures thereof.

According to the preferred embodiment, the color change temperature regulator (C) may be chosen from the group consisting of 1,2,3-tri-dodecanoyl-glycerol (CAS number: 538-24-9), hexadecyl-3,5-di-tert-butyl-4-hydroxybenzoate (CAS number: 67845-93-6), stearyl benzoate (CAS number: 10578-34-4), octadecyl 3-(3,5-di-tert-butyl-4-hydroxyphenyl)propionate (CAS number: 2082-79-3), and mixtures thereof.

In the thermochromic water-based gel ink composition of the disclosure, the thermochromic pigment microcapsules (slurry) are advantageously present in an amount ranging from 10 to 35%, and more advantageously from 20 to 30%, by weight relative to the total weight of the thermochromic water-based gel ink composition.

The melting temperature (or discoloration temperature T4) of the thermochromic pigment microcapsules may vary from 20 to 80° C., preferably from 30 to 80° C., and even more preferably from 40 to 70° C.

The crystallization temperature (or recoloration temperature T1) of the thermochromic pigment microcapsules may vary from −40 to 20° C., preferably from −30 to 10° C., and even more preferably from −20 to 0° C.

The thermochromic pigment microcapsules have advantageously a mean diameter ranging from 0.5 to 30 µm, preferably from 1 to 10 µm, and even more preferably from 3 to 5 µm. This average diameter corresponds to the volume d90 and means that 90% by volume of the microcapsules are smaller than the indicated value of d90. This average diameter can be determined by laser granulometry using a Zetasizer Nano ZS system from Malvern.

According to the present disclosure, the monocarboxylic or polycarboxylic acid present in the thermochromic water-based gel ink composition of the disclosure is used to lower the pH of the aqueous suspension of thermochromic pigment microcapsules obtained at the end of step (ii), preferably at a pH lower than or equal to 4.6, more preferably at a pH lower than or equal to 4.5, and even more preferably at a pH lower than or equal to 4.

In a preferred embodiment, the acid value of said monocarboxylic or polycarboxylic acid should be sufficient to enable to lower the pH at a value below or equal to 4.6, preferably below or equal to 4.5, and more preferably below or equal to 4, in particular if said monocarboxylic or polycarboxylic acid is added in an amount ranging from 0.5 to 5%, preferably from 0.5 to 4%, more preferably from 0.5 to 3.5%, and even more preferably from 1 to 3.5%, by weight relative to the total weight of aqueous suspension of thermochromic pigment microcapsules.

In another embodiment, the monocarboxylic or polycarboxylic acid has preferably a pKa lower than or equal to 6, more preferably lower than or equal to 5.5, and even more preferably lower than or equal to 5. According to this embodiment, more specifically when said carboxylic acid comprises more than one pKa value (for example for di- and tricarboxylic acids), then at least one of the pKa should be lower than or equal to 6, preferably lower than or equal to 5.5, and more preferably lower than or equal to 5.

According to a preferred embodiment of the disclosure, the monocarboxylic or polycarboxylic acid of the disclosure is preferably non-polymeric.

According to another preferred embodiment of the disclosure, the monocarboxylic or polycarboxylic acid of the disclosure preferably comprises from 2 to 10 carbon atoms, and more preferably from 2 to 8 carbon atoms.

According to another preferred embodiment of the disclosure, the monocarboxylic or polycarboxylic acid is preferably a dicarboxylic or tricarboxylic acid.

The monocarboxylic or polycarboxylic acid of the disclosure is preferably chosen from the group consisting of gallic acid, succinic acid, itaconic acid, glutaric acid, oxalic acid, oxaloacetic acid, pyruvic acid, 2-oxo-glutaric acid, malonic acid, salicylic acid, tartaric acid, lactic acid, citric acid, malic acid, picolinic acid, argininosuccinic acid, 2,4,6-trihydroxybenzoic acid, dihydroxymalic acid, aspartic acid, glutathione, glutamic acid, glutamine, 3-methyl-2-oxovaleric acid, acotinic acid, and mixtures thereof, and more preferably citric acid or mixtures comprising citric acid.

Preferably, the monocarboxylic or polycarboxylic acid of the disclosure is added in step (iii) in an amount ranging from 0.5 to 5%, preferably from 0.5 to 4%, more preferably from 0.5 to 3.5%, and even more preferably from 1 to 3.5%, by weight relative to the total weight of aqueous suspension of thermochromic pigment microcapsules.

In the thermochromic water-based gel ink composition of the disclosure, the monocarboxylic or polycarboxylic acid, which is preferably non-polymeric, is advantageously present in an amount ranging from 0.2 to 5%, preferably from 0.3 to 4%, and more preferably from 0.5 to 3.5%, by weight relative to the total weight of the thermochromic water-based gel ink composition.

The thermochromic water-based gel ink composition of the disclosure also comprises a carrier which is advantageously water.

In the thermochromic water-based gel ink composition of the disclosure, the carrier is advantageously present in an amount ranging from 40 to 80%, and more advantageously from 50 to 70%, by weight relative to the total weight of the thermochromic water-based gel ink composition.

When the carrier of the thermochromic water-based gel ink composition of the disclosure is water, co-solvent(s) may be added. The co-solvent(s) can help improving the compatibility/solubility of the ink ingredients. Useful co-solvent(s) include polar solvent(s) miscible in water such as:
  glycol such as ethylene glycol, diethylene glycol, triethylene glycol, polyethylene glycol, propylene glycol, and mixtures thereof,
  glycol ethers such as ethylene glycol monomethyl ether, ethylene glycol monoethyl ether, diethylene glycol monomethyl ether, diethylene glycol monoethyl ether, diethylene glycol monobutyl ether, dipropylene glycol monomethyl ether, dipropylene glycol monobutyl ether, dipropylene glycol monopropyl ether, tripropylene glycol monomethyl ether, and mixtures thereof,
  alcohols such as linear or branched alcohols in $C_1$-$C_6$, for example isopropanol, butanol, isobutanol, pentanol, benzyl alcohol, glycerin, diglycerin, polyglycerin, and mixtures thereof,
  carbonate esters such as propylene carbonate, ethylene carbonate, and mixtures thereof,
  lactames such as 2-pyrrolidone, N-methyl 2-pyrrolidone, and mixtures thereof,
  ketones such as methylisobutylketone (MIBK), acetone or cyclohexanone, and mixtures thereof,
  their mixtures.

The co-solvent(s) may represent from 5 to 20% by weight relative to the total weight of the thermochromic water-based gel ink composition.

The thermochromic water-based gel ink composition of the disclosure also comprises a gelling agent (i.e. a compound capable of generating a gelling effect) preferably chosen from the group consisting of xanthan gum, sodium alginate, sodium carboxymethyl cellulose, gellan gum, tragacanth gum, and diutan gum, and more preferably xanthan gum.

The thermochromic pigment microcapsules of the disclosure may also be mixed with one or more specific adjuvants which may play different roles depending on the intended end use.

Among the adjuvants, mention may be made of:
  rheology modifiers (rheofluidifying agents), such as polyvinylpyrrolidone or hydroxyethylcellulose, antimicrobial agents (biocides), such as isothiazolinones (ACTICIDE® from Thor),
  corrosion inhibitors, such as benzotriazole, antifoam agents, such as aqueous dispersions of modified polysiloxane (MOUSSEX® from Synthron), pH regulators, such as sodium hydroxide, triethanolamine, surfactants, such as polyether polyols (TERGITOL™ from DOW), lubricants, dispersants, coalescing agents, crosslinking agents, wetting agents, humectants, antioxidants, UV stabilizers, film-forming agents, water-soluble solvents, and mixtures thereof.

The thermochromic water-based gel ink composition of the disclosure advantageously comprises one or more specific adjuvants chosen from the group consisting of rheology modifiers, antimicrobial agents (biocides), corrosion inhibitors, and antifoam agents.

Finally, the disclosure also relates to a writing instrument comprising:

an ink reservoir containing a thermochromic water-based gel ink composition according to the disclosure, and a pen body which delivers the thermochromic ink composition stored in the ink reservoir.

The writing instrument of the disclosure is advantageously chosen from ballpoint pens, brush pens, markers, highlighters, and felt pens, and more advantageously ballpoint pens erasable by friction. The supports on which the thermochromic water-based gel ink composition of the disclosure can be applied are porous substrates (or porous surfaces) comprising cellulosic fibers such as paper, printer paper, or cardboard.

Figure 2:
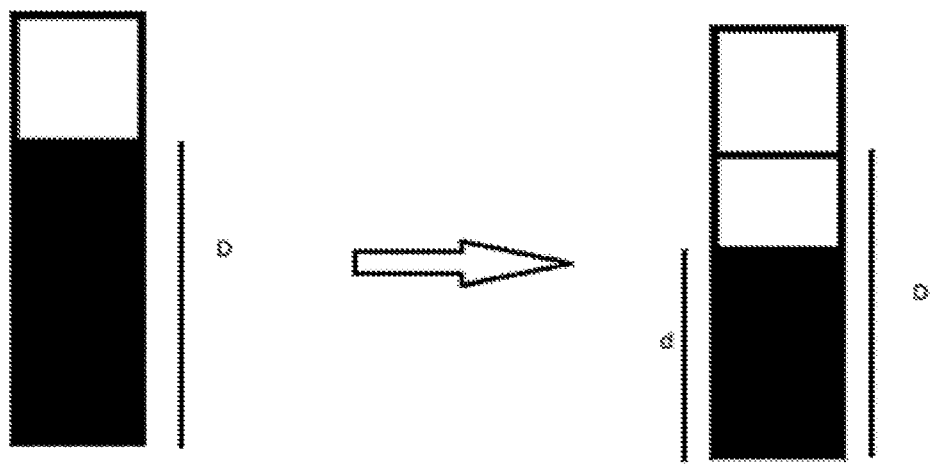
FIG. 2 is a comparative illustration showing a height of an ink composition before and after centrifugation.

In addition to the foregoing, the disclosure also comprises other provisions which will emerge from FIGS. 1 and 2, and the additional description which follows, which relates to the preparation of a thermochromic water-based gel ink composition according to the method of the disclosure, as well as to comparative thermochromic water-based gel ink compositions, and to the characterization of the resulting thermochromic water-based gel ink compositions.

EXAMPLES

Example 1: Experimental Process According to the Disclosure

Preparation of a thermochromic water-based gel ink composition according to the disclosure:

Step (i) of preparation of a thermochromic pigment composition:

A thermochromic pigment composition was prepared by mixing 2.2 parts by weight of 3-(4-diethylamino-2-ethoxyphenyl)-3-(1-ethyl-2-methylindol-3-yl)-4-azaphthalide (compound (A), Blue 63, CAS number: 69898-40-4), 2.0 parts by weight of 4,4'-(hexafluoroisopropylidene)diphenol (Compound (B1), bisphenol AF, CAS number: 1478-61-1), 2.0 parts by weight of 2,2-bis(4-hydroxy-3-methylphenyl) propane (compound (B2), CAS number: 79-97-0), and 93.8 parts by weight of hexadecyl-3,5-di-tert-butyl-4-hydroxybenzoate (compound (C), CAS number: 67845-93-6) of formula (1) below:

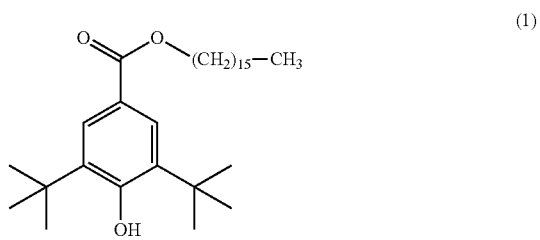

The mixture obtained was heated, under stirring, at a temperature of 110° C. for one hour, until complete solubilization of the compounds (A), (B1) and (B2), in the compound (C).

Step (ii) of preparation of thermochromic pigment microcapsules (encapsulation step):

7.9 parts by weight of an aqueous solution of a (maleic anhydride)-co-(methylvinyl ether) copolymer (solution at 31% by weight of copolymer) was neutralized with 3.7 parts by weight of an aqueous solution of sodium hydroxide (solution at 5.0 M) to pH=4.5. The resulting solution was diluted with 39.7 parts by weight of water, and the mixture was homogenized with a homogenizing mixer at a speed of 15 m·s$^{-1}$ during one hour. 26.8 parts by weight of the previously prepared thermochromic pigment composition was added and the emulsion formed was maintained at a temperature of 85° C. for a period of 30 minutes. 18.8 parts by weight of a melamine-formaldehyde prepolymer solution (aqueous solution at 50% by weight of prepolymer) was slowly added to the mixture over 10 minutes. After complete addition of the prepolymer solution, the mixture was heated at a temperature of 90° C. for 4 hours, at a speed of 15 m·s$^{-1}$.

The pH immediately after the encapsulation step was 5.0-5.5.

Step (iii) of acidification of the aqueous suspension of thermochromic pigment microcapsules:

2.12 parts of anhydrous citric acid were added to the aqueous suspension of thermochromic pigment microcapsules (slurry) obtained at the end of step (ii). The slurry has a final pH of 3.45.

The thermochromic pigment microcapsules were recovered as an aqueous suspension of thermochromic pigment microcapsules (slurry) dispersed in water, the microcapsules having a d90 diameter of 4 µm, determined using a Zetasizer Nano ZS system, Malvern Instruments, under illumination at 632 nm.

The obtained thermochromic pigment microcapsules have the property of changing color from blue to colorless above 62° C. with a hysteresis effect of the color-change.

Step (iv) of preparation of the thermochromic water-based gel ink composition of the disclosure:

10.5 parts of glycerin were heated at 30° C., and 0.2 parts of benzotriazole, 0.1 parts of 1,2-benzisothiazolin-3-one aqueous solution, 0.1 parts of 2-methyl-4-isothiazolin-3-one aqueous solution were added. After dissolution, 0.4 parts of xanthan gum were added. After dispersion of xanthan gum, 25.7 parts of water and 63.0 parts of aqueous suspension of thermochromic pigment microcapsules previously made was added slowly. The mixture was then homogenized 3 hours at 30° C.

Example 2: Experimental Process According to the Disclosure

Preparation of a thermochromic water-based gel ink composition according to the disclosure:

Step (i) of preparation of a thermochromic pigment composition

A thermochromic pigment composition was prepared by mixing 2.2 parts by weight of 3-(4-diethylamino-2-ethoxyphenyl)-3-(1-ethyl-2-methylindol-3-yl)-4-azaphthalide (compound (A), Blue 63, CAS number: 69898-40-4), 2.0 parts by weight of 4,4'-(hexafluoroisopropylidene)diphenol (Compound (B1), bisphenol AF, CAS number: 1478-61-1), 2.0 parts by weight of 2,2-bis(4-hydroxy-3-methylphenyl)propane (compound (B2), CAS number: 79-97-0), and 93.8 parts by weight of hexadecyl-3,5-di-tert-butyl-4-hydroxybenzoate (compound (C), CAS number: 67845-93-6) of formula (1) below:

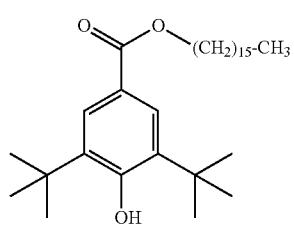

(1)

The mixture obtained was heated, under stirring, at a temperature of 110° C. for one hour, until complete solubilization of the compounds (A), (B1) and (B2), in the compound (C).

Step (ii) of Preparation of Thermochromic Pigment Microcapsules (Encapsulation Step)

7.9 parts by weight of an aqueous solution of a (maleic anhydride)-co-(methylvinyl ether) copolymer (solution at 31% by weight of copolymer) was neutralized with 3.7 parts by weight of an aqueous solution of sodium hydroxide (solution at 5.0 M) to pH=4.5. The resulting solution was diluted with 39.7 parts by weight of water, and the mixture was homogenized with a homogenizing mixer at a speed of 15 m·s$^{-1}$ during one hour. 26.8 parts by weight of the previously prepared thermochromic pigment composition was added and the emulsion formed was maintained at a temperature of 85° C. for a period of 30 minutes. 18.8 parts by weight of a melamine-formaldehyde prepolymer solution (aqueous solution at 50% by weight of prepolymer) was slowly added to the mixture over 10 minutes. After complete addition of the prepolymer solution, the mixture was heated at a temperature of 90° C. for 4 hours, at a speed of 15 m·s$^{-1}$.

The pH immediately after the encapsulation step was 5.0-5.5.

Step (iii) of Acidification of the Aqueous Suspension of Thermochromic Pigment Microcapsules 3.03 parts of gallic acid were added to the aqueous suspension of thermochromic pigment microcapsules (slurry) obtained at the end of step (ii). The slurry has a final pH of 4.47.

The thermochromic pigment microcapsules were recovered as an aqueous suspension of thermochromic pigment microcapsules (slurry) dispersed in water, the microcapsules having a d90 diameter of 4 μm, determined using a Zetasizer Nano ZS system, Malvern Instruments, under illumination at 632 nm.

The obtained thermochromic pigment microcapsules have the property of changing color from blue to colorless above 62° C. with a hysteresis effect of the color-change.

Step (iv) of Preparation of the Thermochromic Water-Based Gel Ink Composition of the Disclosure 10.5 parts of glycerin were heated at 30° C., and 0.2 parts of benzotriazole, 0.1 parts of 1,2-benzisothiazolin-3-one aqueous solution, 0.1 parts of 2-methyl-4-isothiazolin-3-one aqueous solution, were added. After dissolution, 0.4 parts of xanthan gum were added. After dispersion of xanthan gum, 25.7 parts of water and 63.0 parts of aqueous suspension of thermochromic pigment microcapsules previously made was added slowly. The mixture was then homogenized 3 hours at 30° C.

Example 3: Experimental Process According to the Disclosure

Preparation of a Thermochromic Water-Based Gel Ink Composition According to the Disclosure

Step (i) of Preparation of a Thermochromic Pigment Composition

A thermochromic pigment composition was prepared by mixing 2.2 parts by weight of 3-(4-diethylamino-2-ethoxyphenyl)-3-(1-ethyl-2-methylindol-3-yl)-4-azaphthalide (compound (A), Blue 63, CAS number: 69898-40-4), 2.0 parts by weight of 4,4'-(hexafluoroisopropylidene)diphenol (Compound (B1), bisphenol AF, CAS number: 1478-61-1), 2.0 parts by weight of 2,2-bis(4-hydroxy-3-methylphenyl)propane (compound (B2), CAS number: 79-97-0), and 93.8 parts by weight of hexadecyl-3,5-di-tert-butyl-4-hydroxybenzoate (compound (C), CAS number: 67845-93-6) of formula (1) below:

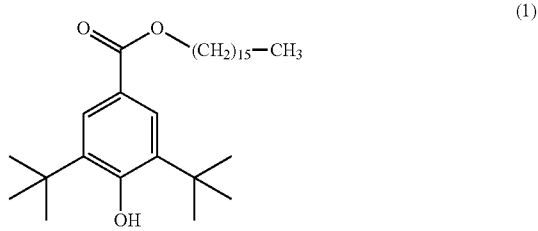

(1)

The mixture obtained was heated, under stirring, at a temperature of 110° C. for one hour, until complete solubilization of the compounds (A), (B1) and (B2), in the compound (C).

Step (ii) of Preparation of Thermochromic Pigment Microcapsules (Encapsulation Step)

7.9 parts by weight of an aqueous solution of a (maleic anhydride)-co-(methylvinyl ether) copolymer (solution at 31% by weight of copolymer) was neutralized with 3.7 parts by weight of an aqueous solution of sodium hydroxide (solution at 5.0 M) to pH=4.5. The resulting solution was diluted with 39.7 parts by weight of water, and the mixture was homogenized with a homogenizing mixer at a speed of 15 m·s$^{-1}$ during one hour. 26.8 parts by weight of the previously prepared thermochromic pigment composition was added and the emulsion formed was maintained at a temperature of 85° C. for a period of 30 minutes. 18.8 parts by weight of a melamine-formaldehyde prepolymer solution (aqueous solution at 50% by weight of prepolymer) was slowly added to the mixture over 10 minutes. After complete addition of the prepolymer solution, the mixture was heated at a temperature of 90° C. for 4 hours, at a speed of 15 m·s$^{-1}$.

The pH immediately after the encapsulation step was 5.0-5.5.

Step (iii) of Acidification of the Aqueous Suspension of Thermochromic Pigment Microcapsules 3.20 parts of itaconic acid were added to the aqueous suspension of thermochromic pigment microcapsules (slurry) obtained at the end of step (ii). The slurry has a final pH of 3.59.

The thermochromic pigment microcapsules were recovered as an aqueous suspension of thermochromic pigment microcapsules (slurry) dispersed in water, the microcapsules having a d90 diameter of 4 μm, determined using a Zetasizer Nano ZS system, Malvern Instruments, under illumination at 632 nm.

The obtained thermochromic pigment microcapsules have the property of changing color from blue to colorless above 62° C. with a hysteresis effect of the color-change.

Step (iv) of Preparation of the Thermochromic Water-Based Gel Ink Composition of the Disclosure 10.5 parts of glycerin were heated at 30° C., and 0.2 parts of benzotriazole, 0.1 parts of 1,2-benzisothiazolin-3-one aqueous solution, 0.1 parts of 2-methyl-4-isothiazolin-3-one aqueous solution, were added. After dissolution, 0.4 parts of xanthan gum were added. After dispersion of xanthan gum, 25.7 parts of water and 63.0 parts of aqueous suspension of thermochromic pigment microcapsules previously made was added slowly. The mixture was then homogenized 3 hours at 30° C.

Example 4: Comparative Experimental Process

Step (i) of Preparation of a Thermochromic Pigment Composition

A thermochromic pigment composition was prepared by mixing 2.2 parts by weight of 3-(4-diethylamino-2-ethoxyphenyl)-3-(1-ethyl-2-methylindol-3-yl)-4-azaphthalide (compound (A), Blue 63, CAS number: 69898-40-4), 2.0 parts by weight of 4,4'-(hexafluoroisopropylidene)diphenol (Compound (B1), bisphenol AF, CAS number: 1478-61-1), 2.0 parts by weight of 2,2-bis(4-hydroxy-3-methylphenyl) propane (compound (B2), CAS number: 79-97-0), and 93.8 parts by weight of hexadecyl-3,5-di-tert-butyl-4-hydroxybenzoate (compound (C), CAS number: 67845-93-6) of formula (1) below:

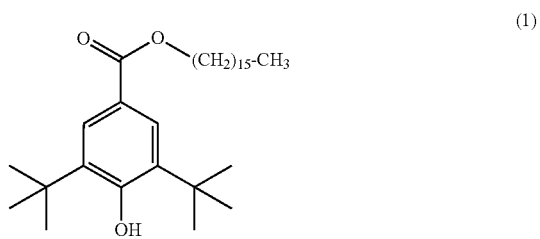

The mixture obtained was heated, under stirring, at a temperature of 110° C. for one hour, until complete solubilization of the compounds (A), (B1) and (B2), in the compound (C).

Step (ii) of Preparation of Thermochromic Pigment Microcapsules (Encapsulation Step)

7.9 parts by weight of an aqueous solution of a (maleic anhydride)-co-(methylvinyl ether) copolymer (solution at 31% by weight of copolymer) was neutralized with 3.7 parts by weight of an aqueous solution of sodium hydroxide (solution at 5.0 M) to pH=4.5. The resulting solution was diluted with 39.7 parts by weight of water, and the mixture was homogenized with a homogenizing mixer at a speed of 15 m·s$^{-1}$ during one hour. 26.8 parts by weight of the previously prepared thermochromic pigment composition was added and the emulsion formed was maintained at a temperature of 85° C. for a period of 30 minutes. 18.8 parts by weight of a melamine-formaldehyde prepolymer solution (aqueous solution at 50% by weight of prepolymer) was slowly added to the mixture over 10 minutes. After complete addition of the prepolymer solution, the mixture was heated at a temperature of 90° C. for 4 hours, at a speed of 15 m·s$^1$.

The pH immediately after the encapsulation step was 5.0-5.5.

Step (iii) of Acidification of the Aqueous Suspension of Thermochromic Pigment Microcapsules 0.15 parts of anhydrous citric acid was added to the aqueous suspension of thermochromic pigment microcapsules (slurry) obtained at the end of step (ii). The slurry has a final pH of 4.8.

The thermochromic pigment microcapsules were recovered as an aqueous suspension of thermochromic pigment microcapsules (slurry) dispersed in water, the microcapsules having a d90 diameter of 4 μm, determined using a Zetasizer Nano ZS system, Malvern Instruments, under illumination at 632 nm.

The obtained thermochromic pigment microcapsules have the property of changing color from blue to colorless above 62° C. with a hysteresis effect of the color-change.

Step (iv) of Preparation of the Comparative Thermochromic Water-Based Gel Ink Composition 10.5 parts of glycerin were heated at 30° C., and 0.2 parts of benzotriazole, 0.1 parts of 1,2-benzisothiazolin-3-one aqueous solution, 0.1 parts of 2-methyl-4-isothiazolin-3-one aqueous solution, were added. After dissolution, 0.4 parts of xanthan gum were added. After dispersion of xanthan gum, 25.7 parts of water and 63.0 parts of aqueous suspension of thermochromic pigment microcapsules previously made was added slowly. The mixture was then homogenized 3 hours at 30° C.

Example 5: Comparative Experimental Process

Step (i) of Preparation of a Thermochromic Pigment Composition

A thermochromic pigment composition was prepared by mixing 2.2 parts by weight of 3-(4-diethylamino-2-ethoxyphenyl)-3-(1-ethyl-2-methylindol-3-yl)-4-azaphthalide (compound (A), Blue 63, CAS number: 69898-40-4), 2.0 parts by weight of 4,4'-(hexafluoroisopropylidene)diphenol (Compound (B1), bisphenol AF, CAS number: 1478-61-1), 2.0 parts by weight of 2,2-bis(4-hydroxy-3-methylphenyl) propane (compound (B2), CAS number: 79-97-0), and 93.8 parts by weight of hexadecyl-3,5-di-tert-butyl-4-hydroxybenzoate (compound (C), CAS number: 67845-93-6) of formula (1) below:

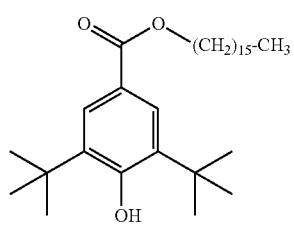

The mixture obtained was heated, under stirring, at a temperature of 110° C. for one hour, until complete solubilization of the compounds (A), (B1) and (B2), in the compound (C).

Step (ii) of Preparation of Thermochromic Pigment Microcapsules (Encapsulation Step)

7.9 parts by weight of an aqueous solution of a (maleic anhydride)-co-(methylvinyl ether) copolymer (solution at 31% by weight of copolymer) was neutralized with 3.7 parts by weight of an aqueous solution of sodium hydroxide (solution at 5.0 M) to pH=4.5. The resulting solution was diluted with 39.7 parts by weight of water, and the mixture was homogenized with a homogenizing mixer at a speed of 15 m·s$^{-1}$ during one hour. 26.8 parts by weight of the previously prepared thermochromic pigment composition was added and the emulsion formed was maintained at a temperature of 85° C. for a period of 30 minutes. 18.8 parts by weight of a melamine-formaldehyde prepolymer solution (aqueous solution at 50% by weight of prepolymer) was slowly added to the mixture over 10 minutes. After complete addition of the prepolymer solution, the mixture was heated at a temperature of 90° C. for 4 hours, at a speed of 15 m·s$^{-1}$.

The pH immediately after the encapsulation step was 5.0-5.5.

The preparation method of Example 5 does not comprise any acidification step (iii).

Step (iv) of Preparation of the Comparative Thermochromic Water-Based Gel Ink Composition 10.5 parts of glycerin were heated at 30° C., and 0.2 parts of benzotriazole, 0.1 parts of 1,2-benzisothiazolin-3-one aqueous solution, 0.1 parts of 2-methyl-4-isothiazolin-3-one aqueous solution were added. After dissolution, 0.4 parts of xanthan gum were added. After dispersion of xanthan gum, 25.7 parts of water and 63.0 parts of aqueous suspension of thermochromic pigment microcapsules previously made was added slowly. The mixture was then homogenized 3 hours at 30° C.

Results

The viscosity and instability of the thermochromic water-based gel ink compositions of Examples 1, 2 and 3 (according to the disclosure) and Examples 4 and 5 (comparative examples) were evaluated according to the following tests:

The viscosity of the thermochromic water-based gel ink composition was measured at 20° C. with a cone plate rheometer, Malvern Kinexus Lab pro, with a cone with an angle of 1° having a diameter of 60 mm at a shear rate of 1 s$^{-1}$.

The instability of the thermochromic water-based gel ink composition was measured after centrifugation at 1500 g during 8 hours at 23° C., with a LUM (brand) LUMiSizer (device) according to the following procedure:

1-0.5 g of the thermochromic water-based gel ink composition was introduced in a cell,
2—The ink composition was centrifuged at 1500 g during 8 hours at 23° C.,
3—The ink composition was separated in two phases: supernatant and sediment.

The measurements were calculated according to the following formula:

$$\% \text{ instability} = ((D-d)/D)*100$$

wherein:
D: height of the ink composition before centrifugation, and
d: height of the ink composition after centrifugation, as shown in FIG. 2.

The results are given in % and correspond to the % of instability.

The viscosity and instability results obtained for the ink compositions of Examples 1, 2, 3, 4 and 5 are summarized in Table 1 below:

TABLE 1

| | Viscosity at 1 s$^{-1}$ (mPa · s) | Instability (%) |
|---|---|---|
| Example 1 (with citric acid, pH = 3.45) (disclosure) | 1986 | 5.1 |
| Example 2 (with gallic acid, pH = 4.47) (disclosure) | 1683 | 4.6 |
| Example 3 (with itaconic acid, pH = 3.59) (disclosure) | 1906 | 5 |
| Example 4 (with citric acid, pH = 4.8) (comparative example) | 173.3 | 71.4 |
| Example 5 (without acid) (comparative example) | 65 | 45.5 |

The ink composition of comparative Examples 4 and 5 shows a very low viscosity (<1500 mPa·s) with no gel network. The capsules thus settle the thermochromic pigment microcapsules agglomerated (sedimentation). The consequence is that the gel is not stable and an ink leakage and/or clogging of the point may occur.

The ink composition of Examples 1, 2 and 3 of the disclosure show that the viscosity is appropriate (>1500 mPa·s) and better than comparative Examples 4 and 5. The capsules of the examples of the disclosure are stable and do not settle. There are no ink leakage and inhomogeneous ink traces, and no formation of bubbles in the pen body.

The invention claimed is:

1. A method for preparing a thermochromic water-based gel ink composition comprising the steps of:
   (i) preparing a thermochromic pigment composition by mixing:
      (A) at least one electron-donating color-developing organic compound,
      (B) at least one electron-accepting compound, and
      (C) at least one color change temperature regulator,
   (ii) encapsulating the thermochromic pigment composition prepared in step (i) in presence of a copolymer surfactant comprising at least one monomer of maleic anhydride, to generate an aqueous suspension of thermochromic pigment microcapsules,
   (iii) acidifying the aqueous suspension of thermochromic pigment microcapsules obtained in step (ii) at a pH lower than or equal to 4.6, by adding a monocarboxylic or polycarboxylic acid,
   (iv) preparing a thermochromic water-based gel ink composition comprising the aqueous suspension of thermochromic pigment microcapsules obtained in step (iii) and at least a gelling agent.

2. A method as claimed in claim 1, wherein the copolymer surfactant is chosen from the group consisting of copolymers of maleic anhydride.

3. A method as claimed in claim 1 or claim 2, wherein the monocarboxylic or polycarboxylic acid is non-polymeric and/or wherein the monocarboxylic or polycarboxylic acid comprises from 2 to 10 carbon atoms.

4. A method as claimed in claim 1, wherein the encapsulating step (ii) is performed by adding an amino resin to the thermochromic pigment composition prepared in step (i) and the copolymer surfactant.

5. A method as claimed in claim 1, wherein the monocarboxylic or polycarboxylic acid is chosen from the group consisting of gallic acid, succinic acid, itaconic acid, glutaric acid, oxalic acid, oxaloacetic acid, pyruvic acid, 2-oxoglutaric acid, malonic acid, salicylic acid, tartaric acid, lactic acid, citric acid, malic acid, picolinic acid, argininosuccinic acid, 2,4,6-trihydroxybenzoic acid, dihydroxymalic acid, aspartic acid, glutathione, glutamic acid, glutamine, 3-methyl-2-oxovaleric acid, acotinic acid and mixtures thereof.

6. A method as claimed in claim 1, wherein the amount of monocarboxylic or polycarboxylic acid is ranging from 0.5 to 5% by weight relative to the total weight of the aqueous suspension of thermochromic pigment microcapsules.

7. An aqueous suspension of thermochromic pigment microcapsules comprising:
   thermochromic pigment microcapsules encapsulating a thermochromic pigment composition comprising:
      (A) at least one electron-donating color-developing organic compound,
      (B) at least one electron-accepting compound, and
      (C) at least one color change temperature regulator,
   a monocarboxylic or polycarboxylic acid,
   a copolymer surfactant comprising at least one monomer of maleic anhydride,
   water
      the aqueous suspension of thermochromic pigment microcapsules having a pH lower than or equal to 4.6.

8. An aqueous suspension of thermochromic pigment microcapsules as claimed in claim 7, wherein the monocarboxylic or polycarboxylic acid is non-polymeric and/or wherein the monocarboxylic or polycarboxylic acid comprises from 2 to 10 carbon atoms.

9. A thermochromic water-based gel ink composition comprising:
   thermochromic pigment microcapsules encapsulating a thermochromic pigment composition comprising:
      (A) at least one electron-donating color-developing organic compound,
      (B) at least one electron-accepting compound, and
      (C) at least one color change temperature regulator,
   a monocarboxylic or polycarboxylic acid,
   a carrier,
   a gelling agent, and
      a copolymer surfactant comprising at least one monomer of maleic anhydride.

10. A thermochromic water-based gel ink composition as claimed in claim 9, wherein the electron-donating color-developing organic compound (A) is chosen from the group consisting of 3-(4-diethylamino-2-ethoxyphenyl)-3-(1-ethyl-2-methylindol-3-yl)-4-azaphthalide (Blue 63, CAS number: 69898-40-4), 2'-(dibenzylamino)-6'-(diethylamino)fluoran (CAS number: 34372-72-0), N,N-dimethyl-4-[2-[2-(octyloxy)phenyl]-6-phenyl-4-pyridinyl]benzenamine (Yellow CK37, CAS number: 144190-25-0), 7-(4-diethylamino-2-hexyloxyphenyl)-7-(1-ethyl-2-methyl-1H-indol-3-yl)-7H-furo[3,4-b]pyridin-5-one (Blue 203, CAS number: 98660-18-5), 2-(2,4-dimethylphenylamino)-3-methyl-6-diethylaminofluoran (Black 15, CAS number: 36431-22-8), 3,3-bis-(1-butyl-2-methyl-indol-3-yl)-3H-isobenzofuran-1-one (Red 40, CAS number: 50292-91-6), and mixtures thereof.

11. A thermochromic water-based gel ink composition as claimed in claim 9, wherein the electron-accepting compound (B) is chosen from the group consisting of 2,2-bis(4-hydroxy-3-methylphenyl)propane (bisphenol C, CAS number: 79-97-0), 4-hexyl-1,3-dihydroxybenzene (4-hexylresorcinol, CAS number: 136-77-6), 4,4'-cyclohexylidenebisphenol (BPZ, CAS number: 843-55-0), 4,4'-(hexafluoroisopropylidene)diphenol (bisphenol AF, CAS number: 1478-61-1), 4,4'-(1-phenylethylidene)bisphenol (CAS number: 1571-75-1), 2,2'-dihydroxybiphenyl (CAS number: 1806-29-7), 4,4'-(1,4-phenylenediisopropylidene)bisphenol (CAS number: 2167-51-3), 1,1-bis(4-hydroxy-3-methylphenyl)cyclohexane (CAS number: 2362-14-3), 9,9-bis(4-hydroxyphenyl)fluorene (CAS number: 3236-71-3), 4,4'-(1,3-phenylenediisopropylidene)bisphenol (CAS number: 13595-25-0), 1,1,1-tris(4-hydroxyphenyl)ethane (CAS number: 27955-94-8), 4,4'-(2-ethylhexylidene)diphenol (CAS number: 74462-02-5), α,α,α'-tris(4-hydroxyphenyl)-1-ethyl-4-isopropylbenzene (CAS number: 110726-28-8), and mixtures thereof.

12. A thermochromic water-based gel ink composition as claimed in claim 9, wherein the color change temperature regulator (C) is chosen from the group consisting of waxes having a melting point ranging from 40 to 80° C.

13. A thermochromic water-based gel ink composition as claimed in claim 9, wherein the thermochromic pigment microcapsules are present in an amount ranging from 10 to 35%, by weight relative to the total weight of the thermochromic ink composition.

14. A thermochromic water-based gel ink composition as claimed in claim 9, wherein the monocarboxylic or polycarboxylic acid is non-polymeric and/or wherein the monocarboxylic or polycarboxylic acid comprises from 2 to 10 carbon atoms.

15. A thermochromic water-based gel ink composition as claimed in claim 9, wherein the monocarboxylic or polycarboxylic acid is present in an amount ranging from 0.2 to 5%.

16. A thermochromic water-based gel ink composition as claimed in claim 9, wherein the gelling agent is chosen from the group consisting of xanthan gum, sodium alginate, sodium carboxymethyl cellulose, gellan gum, tragacanth gum, and diutan gum.

17. A thermochromic water-based gel ink composition as claimed in claim 9, comprising one or more adjuvants chosen from the group consisting of rheology modifiers, antimicrobial agents, corrosion inhibitors, antifoam agents, and mixtures thereof.

18. A writing instrument comprising:
   an ink reservoir containing a thermochromic water-based gel ink composition as claimed in claim 9, and
   a pen body which delivers the thermochromic water-based gel ink composition stored in the ink reservoir.

19. A thermochromic water-based gel ink composition as claimed in claim 9, wherein the monocarboxylic or polycarboxylic acid is chosen from the group consisting of gallic acid, succinic acid, itaconic acid, glutaric acid, oxalic acid, oxaloacetic acid, pyruvic acid, 2-oxo-glutaric acid, malonic acid, salicylic acid, tartaric acid, lactic acid, citric acid, malic acid, picolinic acid, argininosuccinic acid, 2,4,6-trihydroxybenzoic acid, dihydroxymalic acid, aspartic acid, glutathione, glutamic acid, glutamine, 3-methyl-2-oxovaleric acid, acotinic acid, and mixtures thereof.

20. A thermochromic water-based gel ink composition as claimed in claim 9, wherein the monocarboxylic or polycarboxylic acid comprises citric acid.

\* \* \* \* \*

UNITED STATES PATENT AND TRADEMARK OFFICE
CERTIFICATE OF CORRECTION

| | |
|---|---|
| PATENT NO. | : 11,920,047 B2 |
| APPLICATION NO. | : 17/997497 |
| DATED | : March 5, 2024 |
| INVENTOR(S) | : Alexander Nicholas Bourque and Aurore Sauvage |

It is certified that error appears in the above-identified patent and that said Letters Patent is hereby corrected as shown below:

In the Claims

In Claim 3, Column 21, Line 28, after "claim 1" delete "or claim 2".

In Claim 4, Column 21, Line 33, after "resin" insert --solution,--.

In Claim 10, Column 22, Lines 26-27, delete "yl) -7H" and insert --yl)-7H--.

Signed and Sealed this
Thirtieth Day of April, 2024

Katherine Kelly Vidal
*Director of the United States Patent and Trademark Office*